US009080594B2

(12) United States Patent
Tirone et al.

(10) Patent No.: US 9,080,594 B2
(45) Date of Patent: Jul. 14, 2015

(54) REMOVABLE SELF-LOCKING PLUG

(71) Applicant: United Technologies Corporation, Hartford, CT (US)

(72) Inventors: John P. Tirone, Moodus, CT (US); Richard M. Murphy, East Hampton, CT (US); Joseph M. Gambill, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/039,778

(22) Filed: Sep. 27, 2013

(65) Prior Publication Data

US 2014/0093328 A1 Apr. 3, 2014

Related U.S. Application Data

(60) Provisional application No. 61/707,489, filed on Sep. 28, 2012.

(51) Int. Cl.
*F16B 39/04* (2006.01)
*F16B 39/286* (2006.01)

(52) U.S. Cl.
CPC .................................... *F16B 39/286* (2013.01)

(58) Field of Classification Search
USPC .................................................. 411/294, 285
See application file for complete search history.

(56) References Cited

U.S. PATENT DOCUMENTS

| | | | | |
|---|---|---|---|---|
| 4,406,580 | A | 9/1983 | Baran, Jr. | |
| 4,431,218 | A * | 2/1984 | Paul et al. | 285/305 |
| 4,652,018 | A * | 3/1987 | Boghosian | 285/12 |
| 5,058,930 | A | 10/1991 | Schlosser | |
| 5,135,264 | A * | 8/1992 | Elliott-Moore | 285/2 |
| 5,362,110 | A | 11/1994 | Bynum | |
| 5,586,790 | A | 12/1996 | Bynum | |
| 6,247,884 | B1 | 6/2001 | Bynum | |
| 6,908,119 | B2 * | 6/2005 | Murken | 285/305 |
| 8,523,240 | B2 | 9/2013 | Murphy et al. | |
| 2007/0020091 | A1 | 1/2007 | Giaimo et al. | |
| 2007/0020093 | A1 | 1/2007 | Giaimo et al. | |
| 2011/0255914 | A1 | 10/2011 | Bynum | |
| 2013/0145607 | A1 | 6/2013 | Murphy et al. | |

* cited by examiner

*Primary Examiner* — Roberta Delisle
(74) *Attorney, Agent, or Firm* — O'Shea Getz P.C.

(57) ABSTRACT

A self-locking plug is provided that includes a lock carried between a sleeve and a core. The sleeve has an anti-rotation feature for reducing axial rotation of the sleeve during at least one of core removal and core installation. The core extends through the sleeve. The lock includes a first component and a second component. The first component has a protrusion that extends radially out to a circumferentially extending interference surface. The second component has an interference tab that is radially biased against the interference surface.

20 Claims, 4 Drawing Sheets

REMOVABLE SELF-LOCKING PLUG

This application claims priority to U.S. Provisional Appln. No. 61/707,489 filed Sep. 28, 2012, which is hereby incorporated by reference.

BACKGROUND OF THE INVENTION

1. Technical Field

This disclosure relates generally to a plug and, more particularly, to a removable self-locking plug for plugging an aperture such as, for example, a borescope aperture in a turbine engine case.

2. Background Information

A turbine engine typically includes a plurality of turbine engine sections. Each of the turbine engine sections includes one or more internal rotor and/or stator components that are housed within a turbine engine case. The turbine engine case may include one or more inspection apertures through which an inspection tool such as a borescope may be inserted to view the internal rotor and/or stator components. These inspection apertures are typically plugged with removable self-locking plugs.

SUMMARY OF THE DISCLOSURE

According to an aspect of the invention, a self-locking plug is provided that includes a lock carried between a sleeve and a core, which extends through the sleeve. The sleeve has an anti-rotation feature for reducing axial rotation of the sleeve during at least one of core removal and core installation. The lock includes a first component and a second component. The first component has a protrusion that extends radially out to a circumferentially extending interference surface. The second component has a cantilevered interference tab that is radially biased against the interference surface.

According to another aspect of the invention, a self-locking plug is provided that includes a lock carried between a sleeve and a core for preventing rotation of the core with respect to the sleeve in at least one rotational direction. The sleeve has an anti-rotation feature that prevents axial rotation of the sleeve during at least one of core removal and core installation. The core extends through the sleeve. The lock includes a first component and a second component. The first component has a circumferentially extending interference surface that radially tapers along a first axial direction. The second component has a cantilevered interference tab that extends in a second axial direction to a distal tab end, and is radially biased against the interference surface.

According to still another aspect of the invention, an apparatus (e.g., a turbine engine) is provided that includes a body (e.g., a turbine engine case), a sleeve, a core and a lock. The body has an aperture that extends through the body along an axial centerline. The sleeve has a bore that communicates axially through the sleeve. The sleeve engages the body and is rotationally fixed relative to the body during at least one of core installation and core removal. The core extends axially into the bore, and has a threaded portion for plugging the aperture. The lock is carried between the sleeve and the core. The lock has a protrusion and a cantilevered interference tab. The protrusion extends at least partially circumferentially around the centerline, and radially to an interference surface. The interference tab is radially biased against the interference surface.

The protrusion may be an annular protrusion.

The interference surface may radially taper along a first axial direction. The interference tab may extend in a second axial direction to a distal tab end, where the first axial direction is opposite the second axial direction.

The interference surface may extend in the first axial direction to a surface end having a first radius. The interference tab may have a second radius that is less than or substantially equal to the first radius.

The protrusion may have a shelf that extends radially inwards from the interference surface to a circumferentially extending recess surface. The second component may have a ridge that extends radially inwards from the interference tab and engages the shelf during the core removal. A gap may extend radially between the recess surface and the ridge. The first component may have a second shelf, and define an annular channel that extends axially between the protrusion and the second shelf. The ridge may engage the second shelf during the core removal.

The interference surface may extend in the second axial direction from a first surface end to a second surface end. The first component may have a shelf that extends radially inwards from the second surface end to a circumferentially extending recess surface. The second component may have a ridge that extends radially inwards from the interference tab at the distal tab end and engages the shelf during the core removal. A gap may extend radially between the recess surface and the ridge. The first component may have an annular channel that extends axially between a second shelf and the first surface end. The ridge may engage the second shelf during the core removal.

The interference tab may be one of a plurality of interference tabs that are radially biased against the interference surface. The interference tabs may be arranged circumferentially around the axial centerline.

The core may have a head axially connected to a threaded portion. The head may include the first component, and the sleeve may include the second component. Alternatively, the second component may be connected to the head, and the sleeve may include the first component.

The core may have a head axially connected to the threaded portion. The head may include the interference surface, and the sleeve may include the interference tab. Alternatively, the interference tab may be connected to the plug head, and the sleeve may include the interference surface.

The core may extend axially through the bore, and the threaded portion may mate with a threaded portion of the aperture.

The anti-rotation feature may include an axial segment of the sleeve that is press fit into the aperture.

The anti-rotation feature may include a radially extending flange, and a fastener that extends axially through the flange and axially into the body.

The anti-rotation feature may include a radially extending flange with an axially extending body engagement surface that engages an axially extending protrusion of the body during at least one of the core installation and the core removal.

The anti-rotation feature may include a threaded axial segment of the sleeve that mates with a threaded portion of the aperture, and the core is threaded into the sleeve.

The foregoing features and the operation of the invention will become more apparent in light of the following description and the accompanying drawings.

DETAILED DESCRIPTION OF THE INVENTION

Figure 1:
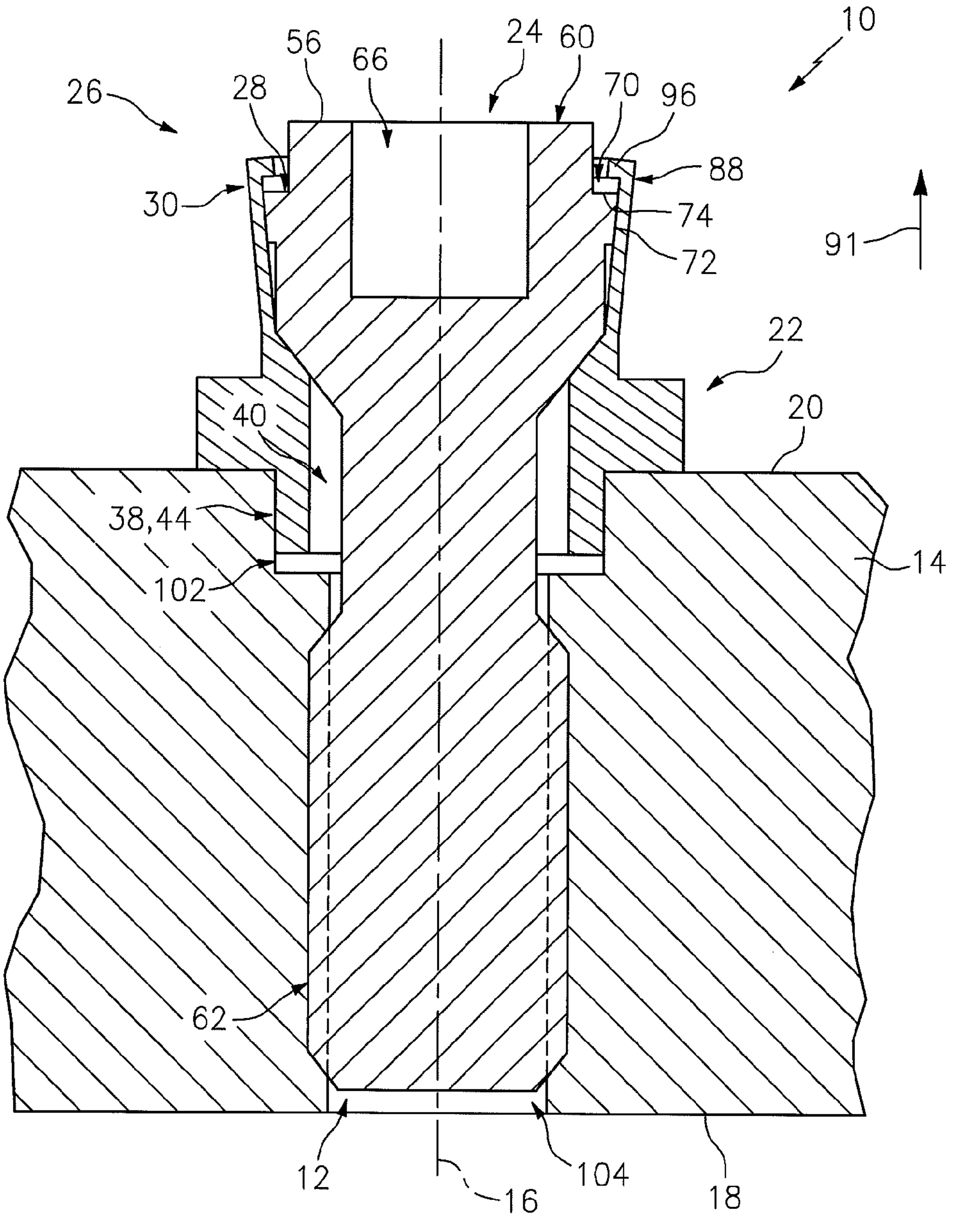
FIG. 1 is a sectional illustration of a self-locking plug for plugging an aperture in a body.

FIG. 1 illustrates a removable self-locking plug 10 for plugging an aperture 12 in a body 14 (e.g., casing) such as, for example, a turbine engine case. The aperture 12 is in the body 14 and communicates through inner surface 18 and opposite outer surface 20, both carried by the body 14. The aperture 12 is generally cylindrical and co-extends with a centerline 16. The self-locking plug 10 includes a sleeve 22, a threaded core 24 and a lock 26. The lock 26 is carried between the sleeve 22 and core 24, and includes a first component 28 and a second component 30.

Figure 2:
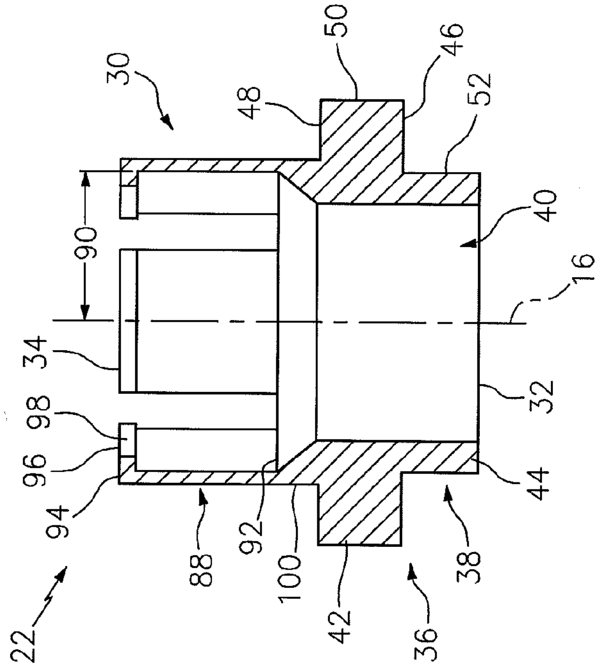
FIG. 2 is a sectional illustration of a sleeve included in the plug of FIG. 1.

Referring to FIG. 2, the sleeve 22 extends axially between a sleeve end 32 and a sleeve end 34. The sleeve 22 includes a body 36, an anti-rotation feature 38 and a bore 40 that extends axially through the sleeve 22. The sleeve 22 embodiment of FIG. 3 also includes the second component 30 that is described below in further detail.

The body 36 includes a base segment 42 and an engagement segment 44. The base segment 42 spans axially between an annular inward surface 46 and an opposite, annular, outward surface 48. The base segment 42 extends radially out from the bore 40 to a base side surface 50. The engagement segment 44 extends axially from the surface 46 to the sleeve end 32. The engagement segment 44 extends radially out from the bore 40 to an engagement surface 52 (e.g., a press-fit surface), which may be contiguous with a radial inner end of the surface 46. In the sleeve 22 embodiment of FIG. 3, the engagement segment 44 is configured as the anti-rotation feature 38; e.g., a press-fitting.

Figure 3:
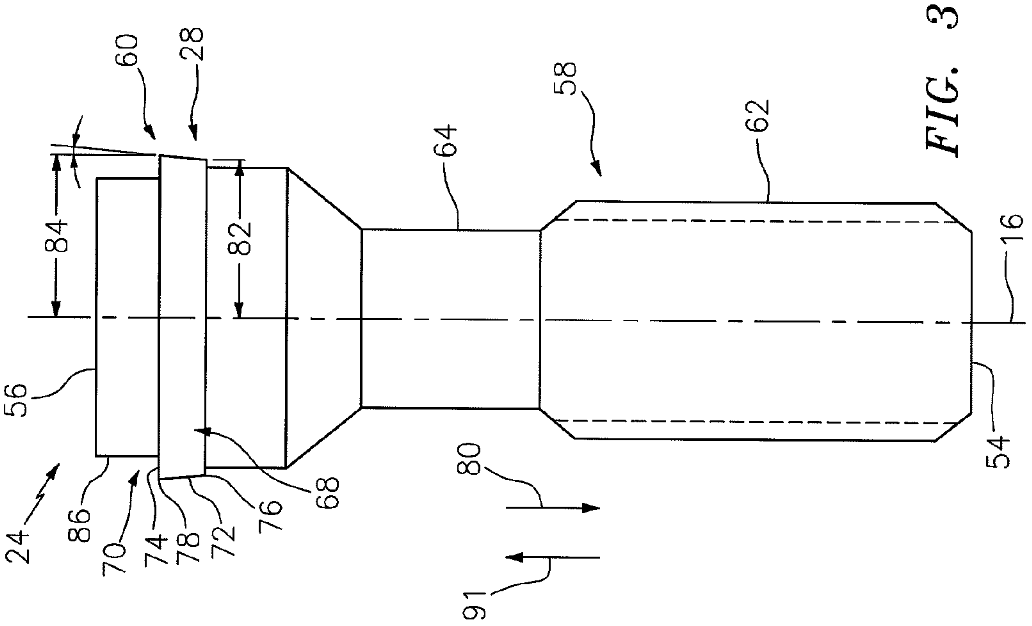
FIG. 3 is a sectional illustration of a core included in the plug of FIG. 1.

Referring to FIG. 3, the core 24 extends axially between a core end 54 and a core end 56. The core 24 includes a shaft 58 and a head 60. The shaft 58 may include a threaded portion 62 and a non-threaded portion 64. The core 24 embodiment of FIG. 4 also includes the first lock component 28, which is described below in further detail.

The threaded portion 62 extends axially between the core end 54 and the non-threaded portion 64. The non-threaded portion 64 extends axially between the threaded portion 62 and the head 60. The head 60 extends axially between the shaft 58 and the core end 56. Referring to FIG. 1, the head 60 may include a torquing feature 66 arranged at (e.g., in, adjacent and/or proximate) the core end 56. An example of a torquing feature is an aperture that may receive a drive head (e.g., a square drive head) of a wrench and/or ratchet. The present disclosure, of course, is not limited to any particular torquing feature configurations. In alternate embodiments, for example, the torquing feature may include a plurality of flats arranged circumferentially around the head 60 in a hexagonal configuration (not shown).

Figure 4:
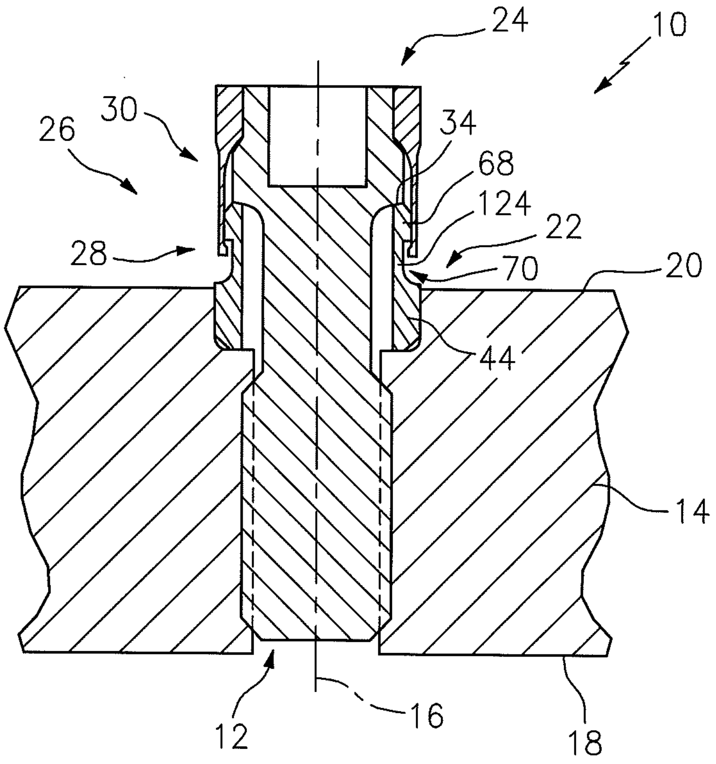
FIG. 4 is a sectional illustration of another self-locking plug for plugging an aperture in a body.

One of the components 28, 30 is configured with (e.g., connected to and/or integral with) the sleeve 22, and one of the components 28, 30 is configured with the core 24. In the lock 26 embodiment of FIG. 1, for example, the first component 28 is integral (e.g., formed unitary) with the core 24, and the second component 30 is integral with the sleeve 22. The present disclosure, of course, is not limited to the foregoing embodiment. In other embodiments, for example as illustrated in FIG. 4, the first lock component 28 may be integral with the plug sleeve 22, and the second lock component 30 may be connected (e.g., press fit, welded, brazed, adhered, etc.) to the core 24.

Referring to FIG. 3, the first component 28 may include a (e.g., annular) protrusion 68 and a (e.g., annular) recess 70. The protrusion 68 and/or the recess 70 may each extend circumferentially around the axial centerline 16; e.g., circumferentially around the head 60. The protrusion 68 includes an interference surface 72 (e.g., a smooth, circumferentially continuous interference surface) and a (e.g., annular) shelf 74. The interference surface 72 extends axially between a surface end 76 and a surface end 78, and may radially taper along a first axial direction 80. A radius 82 of the surface end 76, for example, may be less than a radius 84 of the surface end 78. The interference surface 72 therefore may be angularly offset from the axial centerline 16 by an angle between, for example, zero and four degrees. The shelf 74 extends radially inwards from the surface end 78 to a recess surface 86, which defines the recess 70 axially between the protrusion 68 and, for example, the core end 56.

Referring to FIG. 2, the second component 30 includes one or more cantilevered interference tabs 88 (e.g., flexible fingers) arranged circumferentially around the axial centerline 16 at a radius 90, which may be less than (or substantially equal to) the radius 82 of the surface end 76 (see FIG. 3). Each of the interference tabs 88 extends in a second axial direction 91 (e.g., substantially opposite the first axial direction 80) between a base tab end 92 and a distal tab end 94. Each of the interference tabs 88 may include a circumferentially extending ridge 96 arranged, for example, at the distal tab end 94. The ridge 96 extends radially inwards to a distal ridge end 98. The base tab ends 92 may be connected to an (e.g., tapered) annular lock sleeve 100. In the second component 30 embodiment of FIG. 2, the sleeve 100 is connected to the base segment 42 adjacent the surface 48, and the distal tab ends 94 are arranged at the sleeve end 34.

Referring to FIG. 1, the engagement segment 44 is mated with (e.g., press-fit into) a counter-bore portion 102 of the aperture 12. In this manner, the engagement segment 44 and thus the anti-rotation feature 38 may prevent the sleeve 22 from moving (e.g., rotating) relative to the body 14 during, for example, core installation and/or core removal. The core 24 extends axially through the sleeve bore 40, and the threaded portion 62 is mated with (e.g., threaded into) a threaded portion 104 of the aperture 12. Radial inside surfaces of the interference tabs 88 are radially biased against the interference surface 72, which may prevent the core 24 from rotating and/or loosening when, for example, the body 14 vibrates and/or deforms. The ridges 96 are seated in the lock recess 70, and may prevent the core 24 from moving in the second axial direction 91 by axially engaging the shelf 74.

Figure 5:
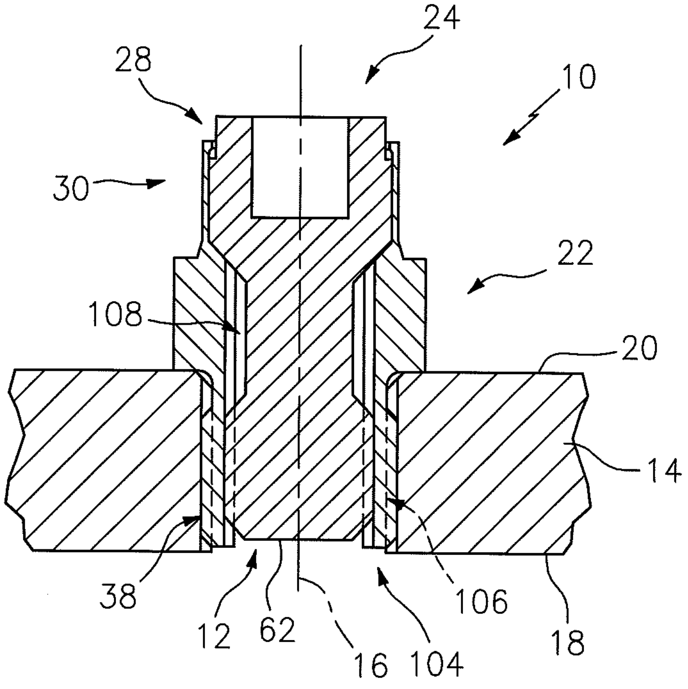
FIG. 5 is a sectional illustration of another self-locking plug for plugging an aperture in a body.

In some embodiments, for example as illustrated in FIG. 5, the sleeve 22 may include a threaded engagement segment 106 and/or a threaded sleeve bore 108. The threaded engagement segment 106 is mated with (e.g., threaded into) the threaded portion 104 of the aperture 12 at a first torque. The threaded portion 62 is mated with (e.g., threaded into) the threaded sleeve bore 108 at a second torque. The first torque may be (e.g., 4 times) greater than the second torque to prevent, for example, the sleeve 22 from moving (e.g., rotating) relative to the body 14 during, for example, core installation and/or core removal. In this manner, the threaded engagement segment 106 is configured as the anti-rotation feature 38. The threaded engagement segment 106 and thus the anti-rotation feature 38 may also include interference threads to further prevent sleeve 22 movement.

Figure 6:
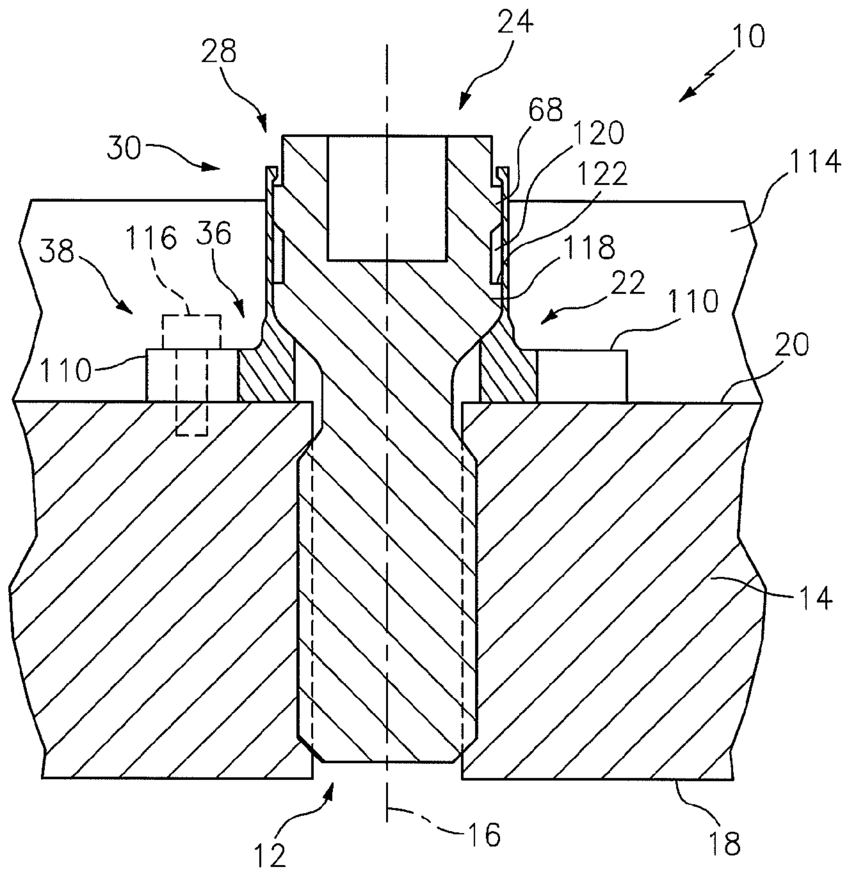
FIG. 6 is a sectional illustration of another self-locking plug for plugging an aperture in a body.
Figure 7:
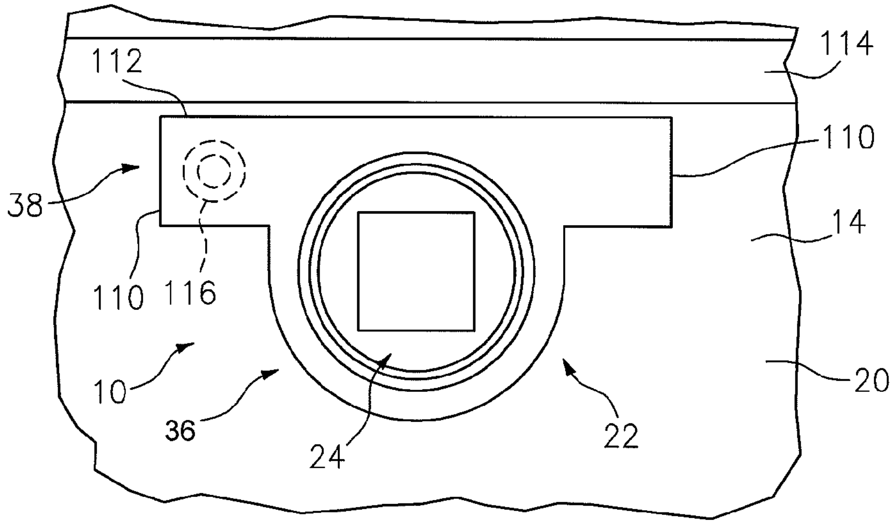
FIG. 7 is a top-view illustration of the plug and body of FIG. 6.

In some embodiments, for example as illustrated in FIGS. 6 and 7, the anti-rotation feature 38 may be configured as one or more flanges 110 that extend radially out from the body 36. The flanges 110 may define an axially extending engagement surface 112. During core installation and/or core removal, the engagement surface 112 may engage (e.g., contact) a protrusion 114 (e.g., a rail) extending axially out from the second surface 20. In this manner, the flanges 110 and thus the anti-rotation feature 38 may prevent the sleeve 22 from moving (e.g., rotating) relative to the body 14 during, for example, core installation and/or core removal. In alternate embodiments, the anti-rotation feature 38 may also include at least one fastener 116 (e.g., a pin or bolt) to alternatively prevent sleeve 22 movement. The fastener 116, for example, may extend axially through the flange 110 and into the body 14.

In some embodiments, for example as illustrated in FIG. 6, the first component 28 may include a (e.g., annular) second protrusion 118 and/or a second recess 120 (e.g., an annular channel). The second recess 120 may extend axially between the protrusion 68 and a (e.g., annular) second shelf 122 defined by the second protrusion 118.

In some embodiments, for example as illustrated in FIG. 2, the first component 28 may include an annular sleeve 124. The sleeve 124 may extend axially between, for example, the engagement segment 44 and the sleeve end 34. The protrusion 68 may be arranged at the sleeve end 34, and the recess 70 (e.g., an annular channel) may extend axially between the protrusion 68 and the engagement segment 44.

An apparatus such as a turbine engine includes a plurality of turbine engine sections. Examples of a turbine engine section may include a fan section, a compressor section, a combustor section, a turbine section, an augmentor section and/or an exhaust section. Each of the turbine engine sections includes one or more internal rotor and/or stator components, which are housed within a respective turbine engine case. The turbine engine case may include one or more inspection apertures through which an inspection tool such as a borescope may be inserted to inspect the internal rotor and/or stator components. Self-locking plugs configured similar to one or more of the self-locking plugs 10 described above and/or illustrated in the drawings may be utilized to plug such inspection apertures. The present invention, of course, is not limited to turbine engine applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A self-locking plug, comprising:

a sleeve having an anti-rotation feature for reducing axial rotation of the sleeve during at least one of core removal and core installation;

a core extending through the sleeve; and a lock carried between the sleeve and the core, the lock including a first component having a protrusion that extends radially out to a circumferentially extending interference surface; and a second component having a cantilevered interference tab that is radially biased against the interference surface.

2. The plug of claim 1, wherein the protrusion comprises an annular protrusion.

3. The plug of claim 1, wherein the interference surface radially tapers along a first axial direction, and the interference tab extends in a second axial direction to a distal tab end.

4. The plug of claim 1, wherein protrusion has a shelf that extends radially inwards from the interference surface, and the second component has a ridge that extends radially inwards from the interference tab and engages the shelf during the core removal.

5. The plug of claim 4, wherein the shelf extends radially inwards to a circumferentially extending recess surface, and a gap extends radially between the recess surface and the ridge.

6. The plug of claim 4, wherein the first component has a second shelf, the first component defines an annular channel that extends axially between the protrusion and the second shelf, and the ridge engages the second shelf during the core removal.

7. The plug of claim 1, wherein the interference tab is one of a plurality of interference tabs that are radially biased against the interference surface, and the interference tabs are arranged circumferentially around an axial centerline.

8. The plug of claim 1, wherein the core has a head that is axially connected to a threaded portion, the head includes the first component, and the sleeve includes the second component.

9. The plug of claim 1, wherein the core has a head that is axially connected to a threaded portion, the second component is connected to the head, and the sleeve includes the first component.

10. A self-locking plug, comprising:

a sleeve having an anti-rotation feature for preventing axial rotation of the sleeve during at least one of core removal and core installation;

a core extending through the sleeve; and a lock carried between the sleeve and the core for preventing rotation of the core with respect to the sleeve in at least one rotational direction, the lock including a first component having a circumferentially extending interference surface that radially tapers along a first axial direction; and a second component having a cantilevered interference tab that extends in a second axial direction to a distal tab end, and is radially biased against the interference surface.

11. The plug of claim 10, wherein the interference surface extends in the first axial direction to a surface end having a first radius, and the interference tab has a second radius that is one of less than and substantially equal to the first radius.

12. The plug of claim 10, wherein the interference surface extends in the second axial direction from a first surface end to a second surface end;

the first component has a shelf that extends radially inwards from the second surface end to a circumferentially extending recess surface; and the second component has a ridge that extends radially inwards from the interference tab at the distal tab end and engages the shelf during the core removal.

13. The plug of claim 12, wherein a gap extends radially between the recess surface and the ridge.

14. The plug of claim 12, wherein the first component has an annular channel that extends axially between a second shelf and the first surface end, and the ridge engages the second shelf during the core removal.

15. The plug of claim 10, wherein the interference tab is one of a plurality of interference tabs that are radially biased against the interference surface, and the interference tabs are arranged circumferentially around an axial centerline.

16. The plug of claim 10, wherein the core has a head axially connected to a threaded portion, the head comprises the first component, and the sleeve comprises the second component.

17. The plug of claim 10, wherein the core has a head axially connected to a threaded portion, the second component is connected to the head, and the sleeve comprises the first component.

18. An apparatus, comprising:

a body having an aperture that extends through the body along an axial centerline;

a sleeve having a bore that communicates axially through the sleeve, wherein the sleeve engages the body and is rotationally fixed relative to the body during at least one of core installation and core removal;

a core extending axially into the bore, and having a threaded portion for plugging the aperture; and a lock carried between the sleeve and the core, the lock having a protrusion and a cantilevered interference tab, wherein the protrusion extends at least partially circumferentially around the centerline, and radially out to an interference surface, and the interference tab is radially biased against the interference surface.

19. The apparatus of claim 18, wherein the body comprises a turbine engine case.

20. The apparatus of claim 18, wherein the protrusion comprises an annular protrusion.

* * * * *